United States Patent
Dolganow et al.

(10) Patent No.: US 8,051,167 B2
(45) Date of Patent: Nov. 1, 2011

(54) OPTIMIZED MIRROR FOR CONTENT IDENTIFICATION

(75) Inventors: Andrew Dolganow, Ottawa (CA); Steve Morin, Ottawa (CA)

(73) Assignee: Alcatel Lucent, Paris (FR)

( * ) Notice: Subject to any disclaimer, the term of this patent is extended or adjusted under 35 U.S.C. 154(b) by 47 days.

(21) Appl. No.: 12/371,079

(22) Filed: Feb. 13, 2009

(65) Prior Publication Data

US 2010/0211668 A1 Aug. 19, 2010

(51) Int. Cl.
G06F 15/173 (2006.01)
(52) U.S. Cl. ........ 709/224; 709/223; 709/225; 709/230; 709/231; 370/230; 370/241
(58) Field of Classification Search .................. 709/223, 709/224, 225, 230; 370/229, 241
See application file for complete search history.

(56) References Cited

U.S. PATENT DOCUMENTS

| | | | | |
|---|---|---|---|---|
| 6,816,455 B2* | 11/2004 | Goldberg et al. | ............. | 370/230 |
| 7,039,641 B2* | 5/2006 | Woo | ............. | 370/400 |
| 7,260,558 B1* | 8/2007 | Cheng et al. | ............. | 706/12 |
| 7,454,499 B2* | 11/2008 | Cantrell et al. | ............. | 709/225 |
| 7,454,792 B2* | 11/2008 | Cantrell et al. | ............. | 726/25 |
| 7,508,764 B2* | 3/2009 | Back et al. | ............. | 370/235 |
| 7,525,958 B2* | 4/2009 | Kumar et al. | ............. | 370/386 |
| 7,555,562 B2* | 6/2009 | See et al. | ............. | 709/240 |
| 7,624,436 B2* | 11/2009 | Balakrishnan et al. | ......... | 726/13 |
| 7,653,062 B2* | 1/2010 | Yazaki et al. | ............. | 370/392 |
| 7,724,670 B2* | 5/2010 | Nilakantan et al. | ........... | 370/235 |
| 7,773,510 B2* | 8/2010 | Back et al. | ............. | 370/230 |
| 7,784,094 B2* | 8/2010 | Balakrishnan et al. | ......... | 726/13 |
| 7,882,554 B2* | 2/2011 | Kay | ............. | 726/11 |
| 2003/0061269 A1* | 3/2003 | Hathaway et al. | ............. | 709/202 |
| 2004/0003094 A1* | 1/2004 | See | ............. | 709/227 |
| 2004/0010612 A1* | 1/2004 | Pandya | ............. | 709/230 |
| 2004/0093513 A1* | 5/2004 | Cantrell et al. | ............. | 713/201 |
| 2004/0199630 A1* | 10/2004 | Sarkissian et al. | ............. | 709/224 |
| 2006/0123481 A1* | 6/2006 | Bhatnagar et al. | ............. | 726/24 |
| 2007/0011734 A1* | 1/2007 | Balakrishnan et al. | ......... | 726/13 |
| 2007/0056028 A1* | 3/2007 | Kay | ............. | 726/11 |
| 2007/0056029 A1* | 3/2007 | Kay | ............. | 726/11 |
| 2007/0056030 A1* | 3/2007 | Kay | ............. | 726/11 |
| 2007/0081471 A1* | 4/2007 | Talley et al. | ............. | 370/252 |
| 2007/0127483 A1* | 6/2007 | Gilon et al. | ............. | 370/392 |
| 2007/0157306 A1* | 7/2007 | Elrod et al. | ............. | 726/14 |
| 2008/0189784 A1* | 8/2008 | Mangione-Smith et al. | ... | 726/23 |
| 2008/0222532 A1* | 9/2008 | Mester et al. | ............. | 715/738 |
| 2009/0168648 A1* | 7/2009 | Labovitz et al. | ............. | 370/229 |
| 2009/0204723 A1* | 8/2009 | Tonsing et al. | ............. | 709/238 |
| 2010/0125900 A1* | 5/2010 | Dennerline et al. | ............. | 726/13 |

\* cited by examiner

*Primary Examiner* — Dohm Chankong
(74) *Attorney, Agent, or Firm* — Kramer & Amado P.C.

(57) ABSTRACT

Various exemplary embodiments relate to a method and related network element including one or more of the following: receiving, by the network node, a packet belonging to an IP flow; when the IP flow is a flow for which content information is to be sent to the content identification device, performing the steps of: determining, using deep packet inspection, that the packet contains a value for at least one field of interest, determining whether all fields of interest needed by the content identification have been seen by the network node among a plurality of packets belonging to the IP flow, and communicating the value of the at least one field of interest to the content identification device.

17 Claims, 7 Drawing Sheets

OPTIMIZED MIRROR FOR CONTENT IDENTIFICATION

TECHNICAL FIELD

Embodiments disclosed herein relate generally to management of traffic in a telecommunications network and, more particularly, to managing transmission of peer-to-peer content over such a network.

BACKGROUND

Modern packet-switched networks accommodate a greater number of users and larger amount of traffic than ever before. Many users have sought to harness the increased bandwidth and connectivity to other users to exchange large files, such as multimedia content and software. To this end, users often engage in so-called Peer-to-Peer (P2P) transfers, in which data is exchanged directly between users, rather than between the user and a central server. Such an approach is advantageous, as it allows sharing of massive amounts of information without the need for a central server with the requisite storage and bandwidth.

Unfortunately, P2P transfers can have a significant impact on the Quality of Experience of other users in the network. As an example, a typical BitTorrent transfer may establish hundreds or even thousands of connections to other peers in the network. Establishing this many connections uses up available bandwidth in transmission lines and burdens the network equipment used to route the packets to the appropriate destination. As the number of users of P2P software has increased, the negative effects on service provider networks have multiplied.

Service providers have been forced to address these problems caused by P2P transfers. Given the significant expenses associated with adding additional equipment, service providers are reluctant to address the P2P problem by simply increasing the capacity of the network. Furthermore, increasing capacity may not be a solution at all, as P2P transfers have the potential to overwhelm any amount of available bandwidth.

As a result, service providers have started to regulate transmission of P2P traffic over their networks. Service providers initially treated all P2P traffic as suspect and gave other transfers preferential treatment over P2P traffic. Such an approach has resulted in significant legal problems for service providers. For example, in the United States, the Federal Communications Commission (FCC) has held that Internet service providers must not discriminate against all P2P traffic, as it violates users' rights to select applications and content of their choice. "Net-neutrality" advocates, those who support fair and equal access to the Internet, have mounted similar legal challenges.

Legal problems aside, treating all P2P traffic as suspect operates on a number of false assumptions. First, such an approach assumes that all P2P transfers are illegitimate, when, in actuality, many content owners use P2P as a cheap, efficient way of allowing users to obtain their content. As an example, many freeware or shareware software developers distribute their software using P2P transfers. Second, the initial approach taken by service providers assumes that P2P transfers have no technical benefits. In fact, P2P transfers allow a massive amount of information to be shared without the need for a large infrastructure of content servers.

Thus, in light of the foregoing, it would be desirable to implement a solution that allows service providers to regulate illegal or otherwise illegitimate P2P transfers, while allowing legitimate P2P transfers to continue as usual. Such a solution would likely be resource intensive and, as such, it would be beneficial to utilize a processing device having resources independent from that of a network node forwarding traffic.

Forwarding all traffic to such a processing device would also constitute a waste of resources, however, in the case of a processing device that only requires a subset of the traffic from each IP flow in order to identify the content. Accordingly, there exists a need for a network element that minimizes the amount of information transmitted to the processing device, while still providing the processing device with enough information to identify the transmitted P2P content.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY

In light of the present need for a network element capable of sending traffic to a processing device while reducing the amount of unnecessary packet processing performed by the processing device and still providing the processing device with enough information to perform its function, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network element for managing transmission of peer-to-peer content. In particular, a network element may receive a packet belonging to a flow. A first Deep Packet Inspection (DPI) device may then perform DPI to identify IP flows that use a P2P application protocol and perform further DPI to determine whether the packet contains any fields useful to a second DPI device. If any such fields of interest are present, the packet is either sent to the second DPI or the information is saved and transmitted to the second DPI at a later time. The first DPI will also determine whether all fields of interest to the second DPI have been seen for a particular IP flow and, if all fields of interest have been seen, mark the flow, such that DPI will not be performed on subsequently received packets belonging to the flow.

It should be apparent that, in this manner, various exemplary embodiments enable the intelligent selection of packets or information to be sent to a content identification device. In particular, by forwarding only packets containing new and relevant information and marking IP flows from which all needed information has been gathered, a network node can greatly reduce the amount of processing the content identification device performs on each flow, thereby increasing the overall productivity of the content identification device. Thus, various exemplary embodiments enable a service provider or other entity to more quickly and efficiently identify the content of a number of P2P transfers.

BRIEF DESCRIPTION OF THE DRAWINGS

In order to better understand various exemplary embodiments, reference is made to the accompanying drawings, wherein.

DETAILED DESCRIPTION

Figure 1A:
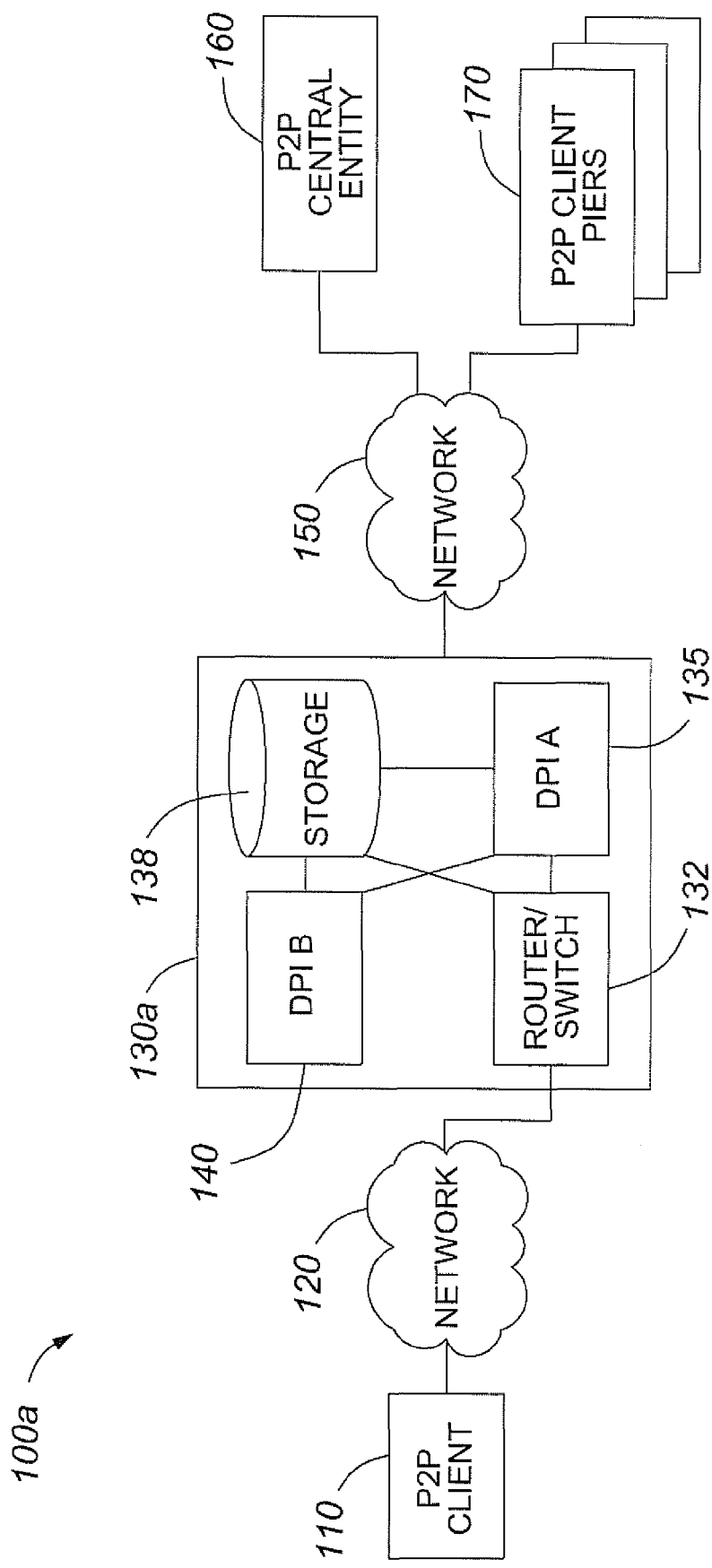
FIG. 1A is a schematic diagram of an exemplary network including a network element configured to intelligently identify traffic to be sent to a content identification module.

Referring now to the drawings, in which like numerals refer to like components or steps, there are disclosed broad aspects of various exemplary embodiments.

FIG. 1A is a schematic diagram of an exemplary network 100a including a network element 130a configured to perform content identification on a P2P transfer. It should be apparent that various exemplary embodiments of the invention could be used to identify the content of traffic utilizing other protocols and that P2P protocols are described in this specification by way of example. Network 100a includes a P2P client 110, a packet-switched network 120, a network element 130a, a packet-switched network 150, a P2P central entity 160, and P2P client peers 170. Network element 130a may include a router or switch 132, a first deep packet inspection (DPI) device A 135, a second DPI B 140, and storage 138.

In various exemplary embodiments, P2P client 110 is a device operated by a user that enables access to network 100a. More specifically, in various exemplary embodiments, P2P client 110 is a cell phone, personal or laptop computer, wireless email device, or any other device that supports peer-to-peer transfers of data. For example, P2P client 110 may be configured to receive and transmit data according to any P2P protocol known to those of skill in the art, including, but not limited to, BitTorrent, Gnutella, and Fast Track.

Packet-switched network 120 provides a connection between P2P client 110 and network element 130a. Network 120 may be any network capable of sending data and requests between P2P client 110 and network element 130a. Accordingly, network 120 may comprise a plurality of routers, switches, bridges, and other components suitable for receiving and forwarding data packets.

Network element 130a is an entity containing components configured to receive, process, and forward packets belonging to an IP flow received from packet-switched network 120. As an example, network element 130a may be owned and/or operated by an Internet Service Provider (ISP) providing services to P2P client 110. Network element 130a may include a router/switch 132, a first DPI A 135, a second DPI B 140, and storage 138.

Router/switch 132 of network element 130a includes hardware, instructions encoded on a machine-readable medium, or a combination thereof, such that router/switch 132 is configured to receive and forward packets. Thus, router/switch 132 may include components to receive a packet from P2P client 110, determine the destination of the packet, and forward the packet toward the appropriate destination. Router/switch 132 may be coupled to at least one of DPI A 134 and DPI B 140, such that the DPI devices 135, 140 process the packets before they are forwarded toward their destination.

DPI devices 135, 140 include hardware, instructions encoded on a machine-readable medium, or a combination thereof, such that DPI devices 135, 140 are configured to examine data packets received by router/switch 132 to identify information associated with the packets. In particular, DPI devices 135, 140 may examine any combination of information in layers 2 through 7 of the Open Systems Interconnection (OSI) model in order to identify an application protocol and P2P key associated with an IP flow.

An IP flow may be any IP flow between P2P client 110 and P2P central entity 160 or P2P client 110 and at least one P2P client peer 170, as identifiable by IP 5-tuple information, which includes the source IP address, source port, destination IP address, destination port, and protocol of the IP flow. This IP flow may be further tunneled inside another networking layer, such as IP, Ethernet, ATM, and the like.

Storage 138 may be a machine-readable medium storing various records used in the operation of DPI A 135. Storage 138 may optionally store a record for each flow indicating the field values collected from that flow and/or whether or not that flow is of interest. Storage 138 may also optionally store a record for each protocol of interest indicating the field which must be collected from an IP flow using that protocol. Exemplary data arrangements used for storage 138 are described in further detail below with reference to FIGS. 2 and 3.

Packet-switched network 150 provides a connection between network element 130a, P2P central entity 160, and P2P client peers 170. Network 150 may be any network capable of sending data and requests between network element 130a, P2P central entity 160, and P2P client peers 170. Accordingly, as with network 120, network 150 may comprise a plurality of routers, switches, bridges, and other components suitable for receiving and forwarding data packets.

P2P central entity 160 may be a system configured to respond to queries from P2P client 110 and P2P client peers 170. In particular, P2P central entity 160 may store a database of information maintained within a particular P2P network, such that a user may search P2P central entity 160 to determine the location of desired content based on the file key. As an example, P2P central entity 160 may be a BitTorrent tracker configured to receive a request including an info_hash from P2P client 110 and respond with a list containing location information of P2P client peers 170 that maintain the content.

P2P client peers 170 may be devices operated by users that support P2P transfers of data to P2P client 110. Thus, as with P2P client 110, P2P client peers 170 may be cell phones, personal or laptop computers, wireless email devices, or any other devices that support peer-to-peer transfers of data. For example, P2P client peers 170 may be configured to receive and transmit data according to any P2P protocol known to those of skill in the art, provided that the P2P client peers 170 communicate using the same protocol as P2P client 110.

P2P client peers 170 may be configured to receive a request for data from P2P client 110, and then transmit the data to P2P client 110 over network 100*a*. As an example, when the P2P protocol is BitTorrent, P2P client 110 and one or more of P2P client peers 170 may engage in a handshake, in which P2P client 110 sends a handshake message including the info_hash corresponding to the requested content. Assuming the P2P client peer 170 has the corresponding content, the P2P client peer 170 returns a handshake message including the info_hash. The P2P client peer 170 may then begin transmission of the data corresponding to the requested info_hash. As described in further detail below, the actions performed by network element 130*a* may be based on the exchange of a handshake or similar negotiation message, or based on the actual transmission of the P2P content.

Having described the components of network 100*a*, a brief summary of the operation of network 100*a* will be provided. It should be apparent that the following description is intended to provide an overview of the operation of network 100*a* and network element 130*a* and is therefore a simplification in some respects. The detailed operation of network element 130*a* will be described in further detail below with reference to FIGS. 4, 5A, and 5B.

In operation, according to various exemplary embodiments, DPI A 135 may be configured to use deep packet inspection to identify an application protocol associated with an IP flow received by router/switch 132, and then determine whether the application protocol is a protocol of interest. DPI A 135 may accomplish this by, for example, performing pattern-based, statistical, or behavioral analysis of the packets being sent and/or received by a given system and classifying an IP flow as "Peer-to-Peer" or otherwise "of interest." In various embodiments, the protocols of interest will include various P2P protocols and other application protocols.

DPI A 135 may also determine whether the flow is of interest by accessing a table or set of rules in storage 138 indicating whether each flow is considered "of interest." An IP flow might not be considered of interest if, for example, sufficient data has been previously gathered to enable content identification by DPI B 140 or if the flow is for an application that does not require mirrored processing.

When a packet received by DPI A 135 belongs to an IP flow of interest and is using a protocol of interest, DPI A may then use deep packet inspection to detect the presence of any field of interest, i.e. any field required by DPI B 140. DPI A 135 may determine which fields are "of interest" by accessing a table or set of rules in storage 138 identifying the fields required by DPI B 140 for each protocol. If a field of interest is found, the packet may be forwarded to DPI B 140. DPA A 135 may also store the value of the field of interest in an IP flow record of storage 138.

DPI A 135 will also determine whether it has seen every field of interest for the protocol by comparing the fields previously seen, as indicated in the flow record, to the fields needed as described by a protocol record from the table or set of rules in storage 138 identifying the fields required by DPI B 140 for each protocol. When all fields have been seen, DPI A 135 will mark the IP flow as not of interest in the flow record in storage 138. Thus, when all fields have been seen, future packets received from the IP flow will not be mirrored to DPI B 140.

Once DPI B 140 receives the packet, it will perform further deep packet inspection in order to identify the content of the IP flow and take appropriate action depending on the content. Such action may either be taken by DPI B 140 on its own or through a notification sent, either directly or indirectly, to other network elements such as, for example, router/switch 132. Such action may include, but is not limited to, blocking the flow, throttling the flow, logging the addresses of the involved clients, and taking no action.

It should be apparent from this description of network element 130*a* that the implementation of screening packets for relevance will enable DPI A 135 to send only relevant traffic to DPI B 140. This implementation thereby reduces the total amount of processing done by DPI B 140, without compromising the ability of DPI B 140 to identify the content associated with the IP flow. In particular, DPI B 140 will not waste resources by processing irrelevant packets, resulting in a significant performance increase.

Figure 1B:
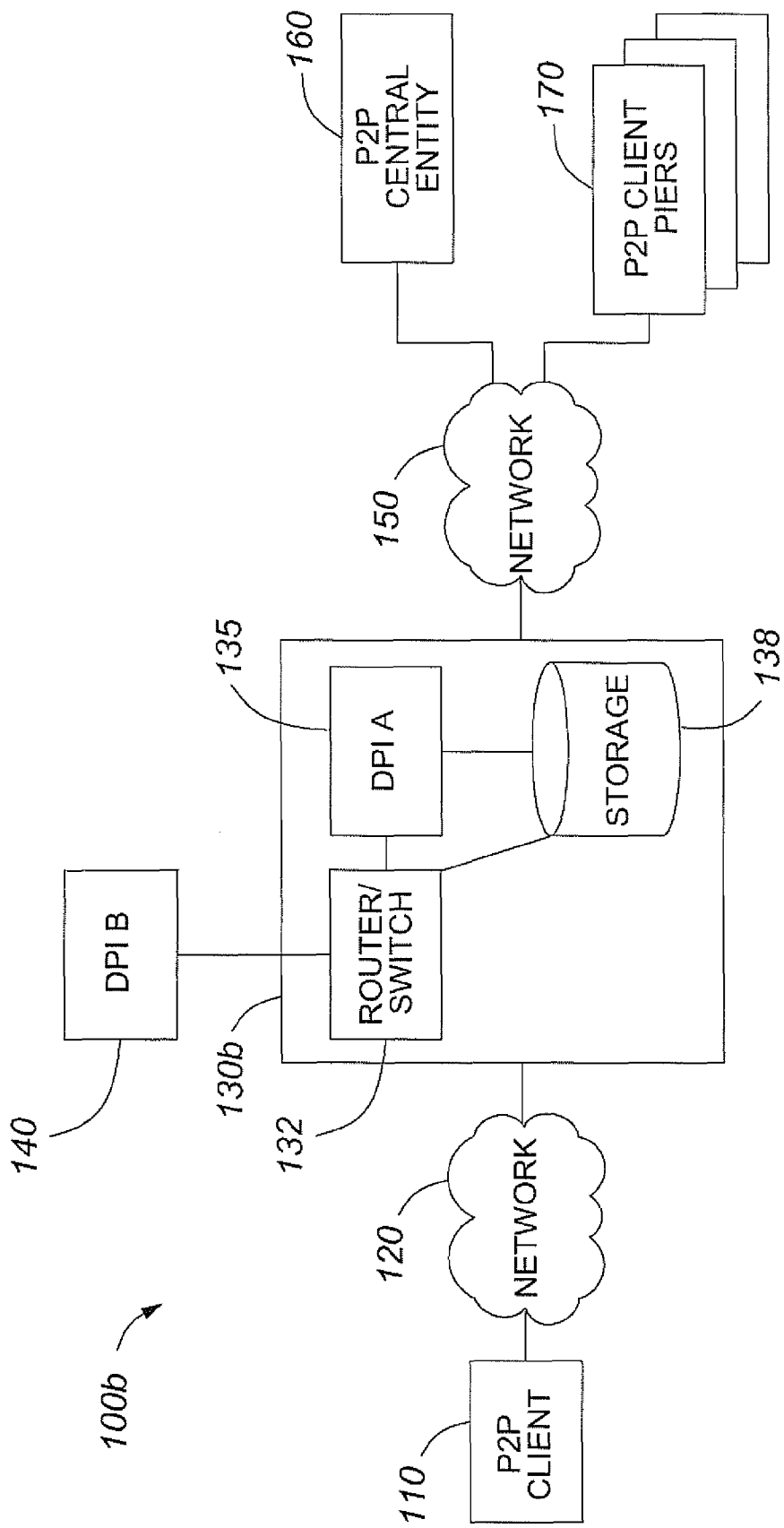
FIG. 1B is a schematic diagram of an exemplary network including a network element configured to intelligently identify traffic to be sent to a coupled content identification element.

FIG. 1B is a schematic diagram of an exemplary network 100*b* including a network element 130*b* coupled to a deep packet inspection device 140 configured to perform content identification on a P2P transfer. As with network 100*a*, network 100*b* includes a P2P client 110, packet-switched networks 120, 150, a P2P central entity 160, and P2P client peers 170. Unlike network 100*a*, network element 130*b* of network 100*b* includes only router/switch 132, DPI A 135, and storage 138. DPI B 140 is a standalone device connected to network element 130*b*.

In operation, DPI A 135 and DPI B 140 perform the functionality described above in connection with FIG. 1A. In order to ensure that DPI B 140 receives the information required to identify the content of an IP flow, however, DPI A 135 transmits the information to DPI B 140. This transmission may be accomplished, for example, by mirroring (i.e., sending a duplicate) the packets in the flow from DPI A 135 to DPI B 140. Alternatively, DPI A 135 may extract all fields of interest from packets belonging to an IP flow, build a single message packet containing these fields, and send the message packet to DPI B 140, as further described below with reference to FIG. 5B.

Figure 2:
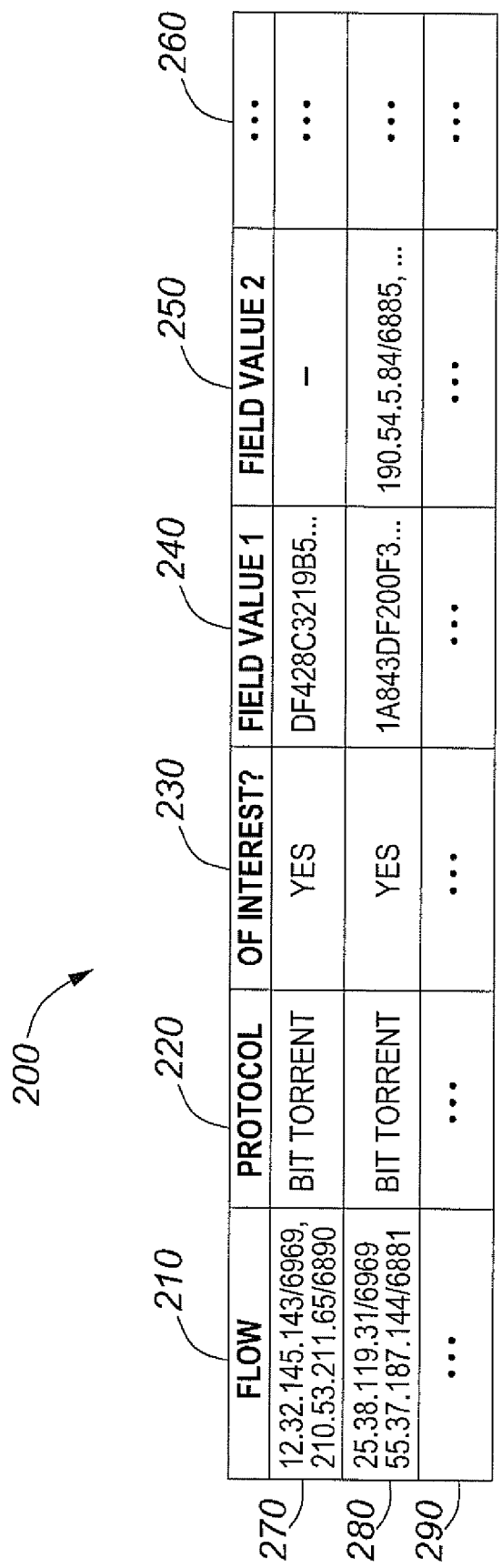
FIG. 2 is a schematic diagram of an exemplary data arrangement used to store an indication of whether an IP flow is of interest and the values of fields of interest seen for an IP flow.

FIG. 2 is a schematic diagram of an exemplary data arrangement 200 used to store an indication of whether an IP flow is of interest and the values of fields of interest seen for an IP flow. Data arrangement 200 may be, for example, a table in a database stored in storage 138. Alternatively, data arrangement 200 could be a series of linked lists, an array, or a similar data structure. Thus, it should be apparent that data arrangement 200 is an abstraction of the underlying data; any data structure suitable for storage of this data may be used.

Data arrangement 200 may include numerous sets of data: flow field 210, protocol field 220, of interest field 230, and a number of field value fields 240, 250, 260. Flow field 210 may identify an IP flow using flow information such as source and destination IP address and port numbers. Protocol field 220 may indicate which application protocol an IP flow is using. Of interest field 230 may indicate whether an IP flow is considered "of interest" and is therefore a flow for which content information is to be sent to DPI B 140. Field value fields 240, 250, 260 may indicate values for fields of interest previously extracted from the IP flow.

Alternatively, data arrangement 200 may not include actual values in field value fields 240, 250, 260, but rather a simple indication as to whether that field has been seen previously, such as a Boolean value or the name of the field. A particular protocol may have fewer fields of interest than provided for in data arrangement 200, in which case extra field value fields 240, 250, 260 will be left blank. Alternatively, data arrangement 200 may contain only a single field value field (not shown) containing a delimited list of values extracted from the IP flow.

In an alternative embodiment, data arrangement 200 may be represented by two separate tables (not shown). The first table (not shown) may contain, for example, flow field 210, protocol field 220, and of interest field 230. The second table (not shown), then, may contain flow field 210 and field value fields 240, 250, 260.

As an example, flow record 270 is associated with the IP flow identified by source address 12.32.145.143/6969 and destination address 210.53.211.65/6890. Flow record 270 indicates that the flow is using the BitTorrent protocol, that the flow is of interest, and that packets will therefore be sent to DPI B 140 for this flow. Flow record 270 also indicates that field value "DF428C3219B5..." has been extracted from the flow. Likewise, flow record 280 indicates that the IP flow identified by the source-destination pair 25.38.119.31/6969, 55.37.187.144/6881 is also of interest, is using the BitTorrent protocol, and that field values "1A843DF200F3..." and "190.54.5.84/6885,..." have been extracted from the flow. Data arrangement 200 may include numerous other flow records 290.

Figure 3:
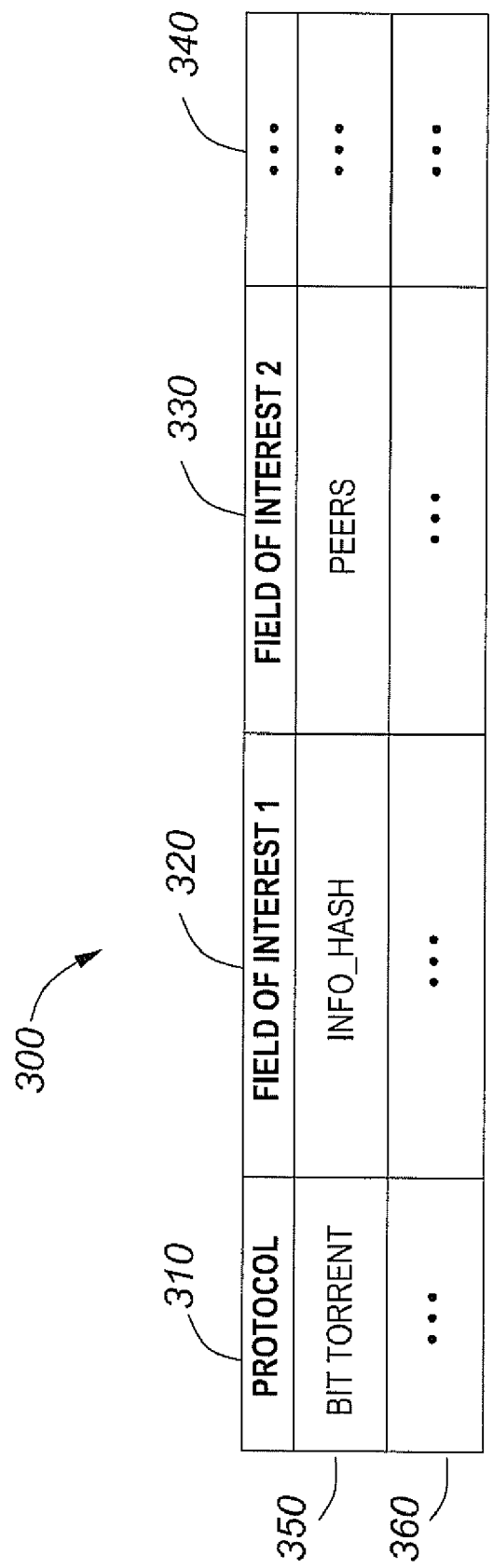
FIG. 3 is a schematic diagram of an exemplary data arrangement used to determine the fields that must be gathered for each protocol of interest.

FIG. 3 is a schematic diagram of an exemplary data arrangement used to determine the fields that must be gathered for each protocol of interest. Data arrangement 300 may be, for example, a table in a database stored in storage 138. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include numerous sets of data: protocol field 310 and a number of field of interest fields 320, 330, 340. Protocol field 310 may identify a protocol of interest. Alternatively, protocol field 310 may identify a protocol and data arrangement 300 may include an additional of interest field (not shown) indicating whether a protocol is a protocol of interest. Protocols of interest may include various P2P protocols and/or various other protocols.

Field of interest fields 320, 330, 340 may indicate the fields of interest for a protocol of interest. Fields of interest may be those fields needed by DPI B 140 for a particular protocol of interest. A particular protocol may have fewer fields of interest than provided for in data arrangement 300, in which case extra field of interest fields 340, 350, 360 will be left blank. Alternatively, data arrangement 300 may contain only a single field of interest field (not shown) containing a delimited list of all fields of interest for a particular protocol.

As an example, protocol record 350 indicates that the BitTorrent protocol is a protocol of interest. As such, DPI A 135 will forward content information from flows utilizing the BitTorrent protocol. Protocol record 350 also indicates that the info_hash and peers fields are fields of interest for the BitTorrent protocol. Accordingly, DPI A 135 will ensure that, for an IP flow utilizing the BitTorrent protocol, DPI B 140 will receive values for the info_hash and peers fields. Data arrangement 300 may include numerous other protocol records 360.

Figure 4:
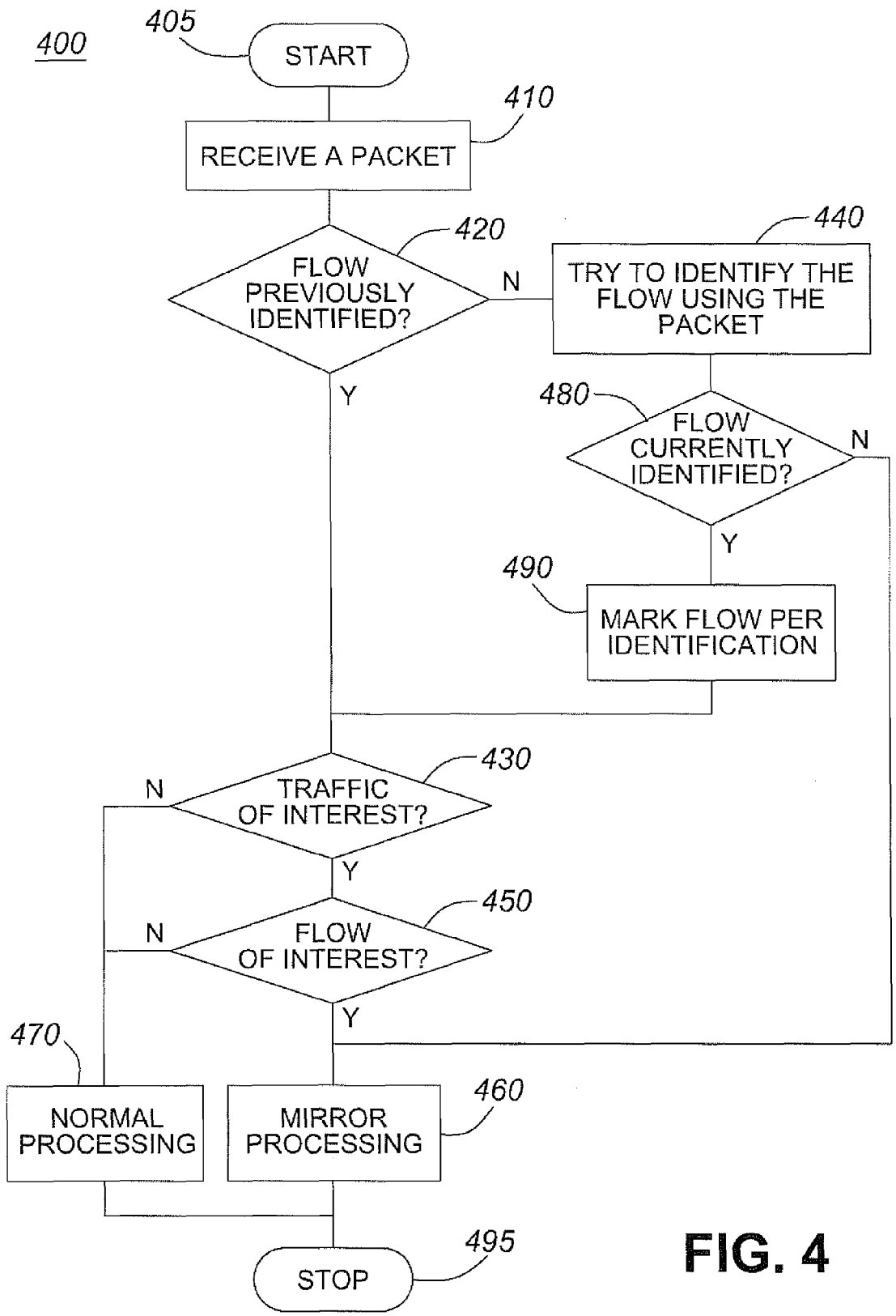
FIG. 4 is a flowchart of an exemplary method for intelligently determining when to send traffic to a content identification device.

FIG. 4 is a flowchart of an exemplary method 400 for intelligently determining when to send traffic to a content identification device. According to various embodiments, the content identification device is DPI B 140. Exemplary method 400 may be performed by the components of network 100a, 100b to manage, for example, P2P transmissions between a P2P client 110 and P2P central entity 160 or at least one P2P client peer 170.

In the description that follows, the steps are described as performed by one or more specific components of network 100a, 100b. As will be apparent to those of skill in the art, the steps may be distributed differently among the components of network 100a, 100b.

Exemplary method 400 starts in step 405 and proceeds to step 410 where network element 130a, 130b receives a packet belonging to an IP flow. As an example, network element 130a, 130b may receive a packet belonging to an IP flow between a P2P client 110 and a P2P central entity 160.

Exemplary method 400 then proceeds to step 420, where DPI A 135 determines whether or not the application protocol used by the IP flow has been previously identified. DPI A 135 may make this determination by accessing the flow record for the IP flow and determining whether a protocol has been previously associated with the flow in protocol field 220.

If the protocol has been previously identified, method 400 proceeds to step 430. Otherwise, method 400 proceeds to step 440, where DPI A 135 attempts to identify the application protocol used by the IP flow by inspecting the packet. Method 400 then proceeds to step 480 where DPI A 135 determines whether the protocol has been identified. If the protocol has been successfully identified, method 300 will proceed to step 490. Otherwise, method 400 will proceed to step 460.

At step 490, the flow record corresponding to the IP flow will be updated to store the protocol used by the IP flow in protocol field 220. By performing this step, the method may skip this identification routine on subsequent packets received for this flow by moving from step 420 directly to step 430.

At step 430, DPI A 135 determines whether the protocol used by the IP flow is of interest. DPI A 135 may make this determination by searching storage 138 for a record corresponding to the protocol used by the IP flow. If a record exists, the protocol is of interest. Alternatively, data structure 300 may have an additional field (not shown) indicating whether a protocol is of interest. In this scenario, DPI A 135 will find a protocol record for the protocol and read this of interest field. If the protocol is one of interest, method 400 proceeds to step 450. Otherwise, method 430 proceeds to step 470, where the packet will be processed according to the normal rules of DPI A 135. No information is likely to be sent to DPI B 140 in step 470. After completing step 470, method 400 ends at step 495.

At step 450, DPI A 135 will determine whether the IP flow is of interest. This may be accomplished by accessing the IP flow record corresponding to the flow and reading the of interest field 230. If the flow is of interest, method 400 will proceed to step 460. Otherwise, method 400 will proceed to step 470.

At step 460, the packet will be processed further in order to identify and/or extract fields useful to DPI B 140 and determine if the flow continues to be of interest. This functionality will be described in greater detail with reference to FIGS. 5A and 5B below. After completion of step 460, method 400 ends at step 495.

Figure 5A:
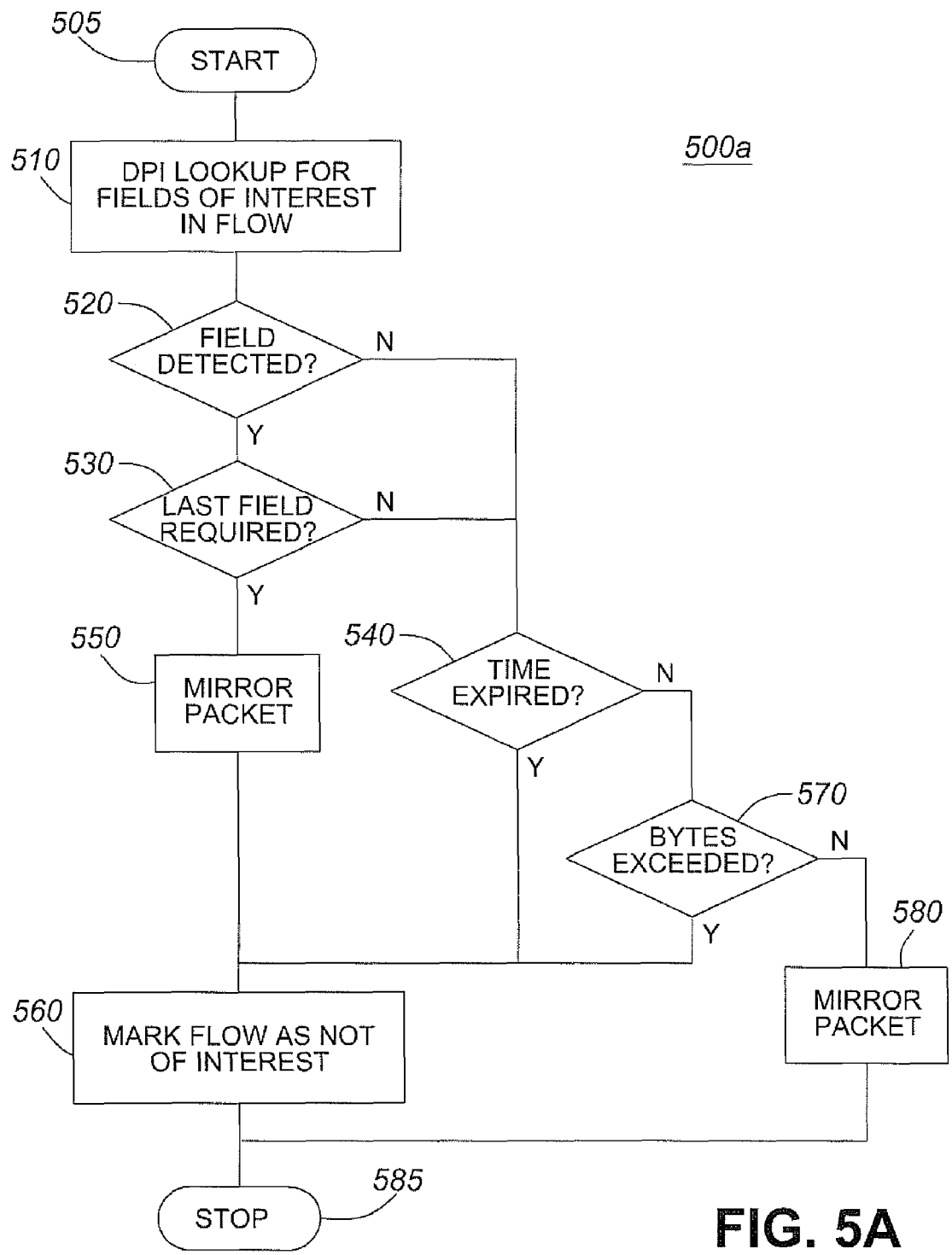
FIG. 5A is a flowchart of an exemplary method for performing step 460 of FIG. 4.

FIG. 5A is a flowchart of an exemplary method for performing step 460 of FIG. 4. Exemplary method 500a begins at step 505 and proceeds to step 510, where DPI A 135 performs deep packet inspection on the packet to search for fields of interest not yet collected for the IP flow. DPI A 135 may identify the fields of interest not yet collected by comparing the field value fields 240, 250, 260 located in the flow record with the fields of interest 320, 330, 340 identified in the protocol record for the protocol used by the IP flow.

Method 500a then moves on to step 520 where DPI A 135 will determine whether a field of interest not yet collected for the IP flow has been found. If a field of interest has been found, the method proceeds to step 530, otherwise it will proceed to step 540.

At step 530, DPI A 135 will determine whether all fields of interest for the IP flow have now been extracted. Again, DPI A 135 may perform this step by comparing the presently extracted value(s) and the previously extracted values located in the IP flow record with the fields of interest identified in the protocol record for the protocol used by the IP flow. If all fields of interest have now been extracted, method 500*a* proceeds to step 550. Otherwise, method 500*a* proceeds to step 540.

At step 540, DPI A 135 will determine whether a preset time limit for the IP flow has expired. This step is done to ensure DPI A 135 does not spend more than a predetermined amount of time attempting to process any given flow.

If the time has expired, method 500*a* proceeds to step 560. Otherwise, method 500*a* will proceed to step 570, where DPI A 135 will determine whether a preset number of bytes for the IP flow has been exceeded. This step ensures DPI A 135 does not process more than a predetermined number of bytes in attempting to process any given flow. Alternatively, the step may ensure that DPI A 135 does not transmit more than a predetermined number of bytes to DPI B 140 for any given flow. If the maximum number of bytes has been exceeded, method 500*a* will proceed to step 560. Otherwise, method 500*a* will proceed to step 580.

At step 580, DPI A 135 simply sends the packet to DPI B 140. This step may include mirroring the packet to DPI B 140, such that network element 130*a*, 130*b* sends the packet to the next hop toward its destination as well. Alternatively, DPI A 135 may redirect the packet to DPI B 140, such that DPI B 140 may then send the packet onward to the next hop. After completion of step 580, method 500*a* will proceed to step 585 where the method will end.

Step 550 is substantially identical to step 580, in that DPI A 135 will either mirror or redirect the packet to DPI B 140. After completion of step 550, method 500*a* will proceed to 560. At step 560, DPI A will update the flow record to indicate that the IP flow is no longer of interest by altering of interest field 230. After performance of this step, any subsequent packet for this flow will be directed by step 450 of FIG. 4 to the normal processing step 470. Because the time has expired for the IP flow, the byte limit for the flow has been exceeded, or all fields of interest have been communicated to DPI B 140 for the flow, subsequent packets of the same flow need not be processed. Method 500*a* then proceeds to step 585 where it terminates.

As an example, assume storage 138 contains records as shown in FIGS. 2 and 3 and network element 130*a*, 130*b* is implemented according to methods 400 and 500*a*. When network element 130*a*, 130*b* receives a packet at step 410, it proceeds to step 420. DPI A 135 reads the packet and determines that it belongs to the IP flow represented by flow record 270. By examining flow record 270, DPI A 135 determines that the protocol has been previously identified as BitTorrent and proceeds to step 430. DPI A 135 then locates a protocol record for BitTorrent, determines that BitTorrent is a protocol of interest, and proceeds to step 450. By examining the of interest field 230 of the IP flow record 270, DPI A 135 determines that the IP flow is also of interest and proceeds to the mirror processing step 460.

DPI A 135 proceeds to step 510 and performs deep packet inspection on the packet. DPI A 135 determines that it has not previously located the peers field 330 by comparing flow record 270 and protocol record 350. Upon performing deep packet inspection, DPI A 135 locates a value for the peers field 330 in the packet, and marks flow record 270 to reflect this. DPI A 135 then determines, by comparing flow record 270 and protocol record 350, that this is the last field needed by DPI B 140 for this flow. DPI A 135 proceeds to mirror the packet to DPI B 140 for further processing at step 550 and updates flow record 270 to indicate that the IP flow is not of interest at step 560. The method then proceeds to step 585 and then to step 495, ending the process for this packet.

Figure 5B:
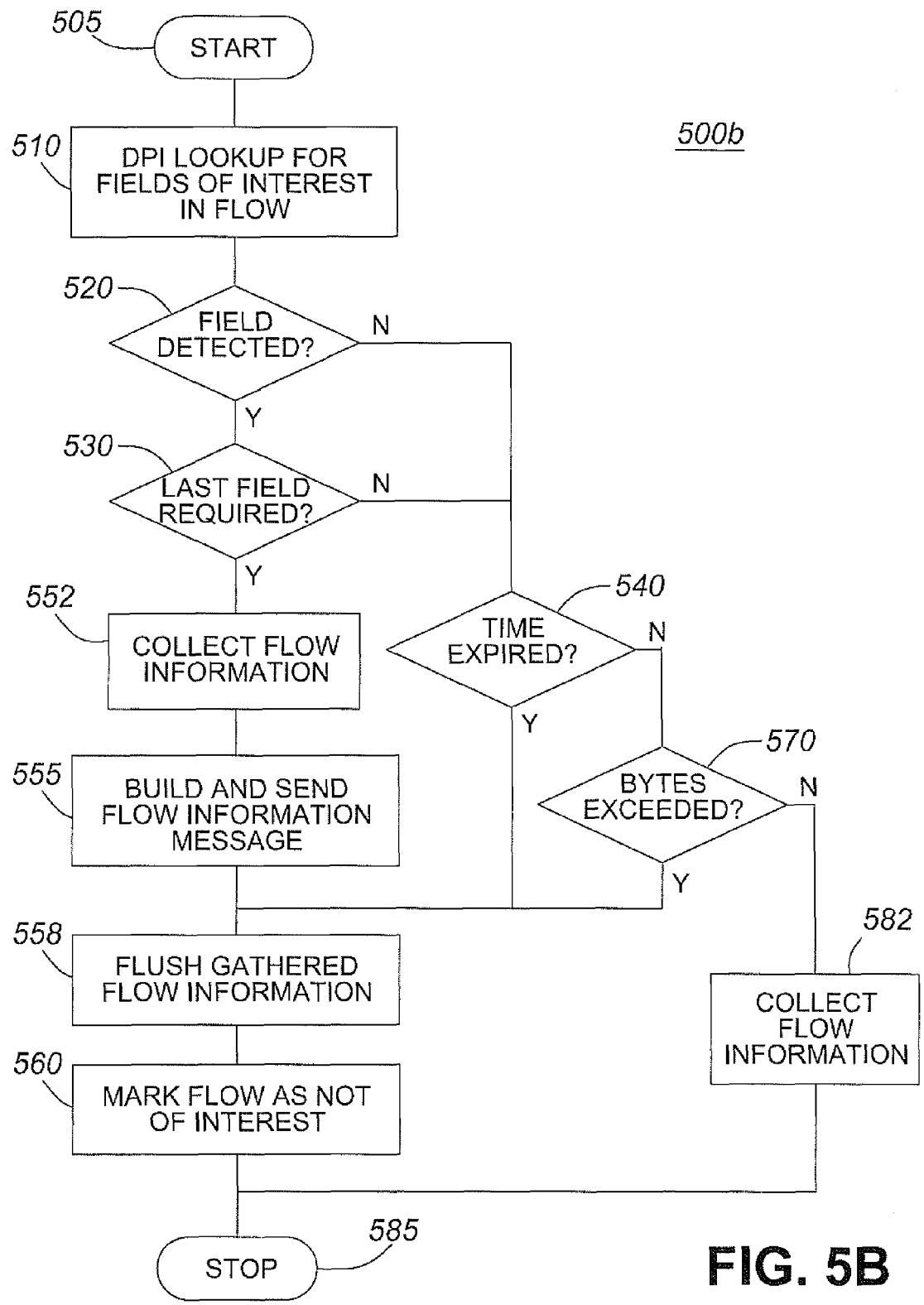
FIG. 5B is a flowchart of an alternative exemplary method for performing step 460 of FIG. 4.

FIG. 5B is a flowchart of an alternative exemplary method for performing step 460 of FIG. 4. Exemplary method 500*b* is the same as exemplary method 500*a*, except step 550 has been replaced by steps 552 and 555, step 580 has been replaced by step 582, and step 558 has been added directly after steps 540, 555, and 570. In exemplary method 500*b*, rather than mirroring each relevant packet to DPI B 140, DPI A 135 will collect any relevant information and, once all relevant information has been collected, send a single message to DPI B 140 containing the relevant information.

At step 552, DPI A 135 will simply record the value of the field identified in step 520 in flow record 270. After completing step 552, method 500*b* proceeds to step 555, where DPI A 135 constructs a message containing the IP flow identifying information that may comprise, for example, flow field 210, values for all fields of interest 320, 330, and the values contained in field value fields 240, 250, 260. The message is then sent to DPI B 140 and method 500*b* proceeds to step 558.

At step 558, DPI A 135 clears the values stored in field value fields 240, 250, 260. This information is no longer needed, as DPI A 135 has either sent DPI B 140 the information it needs for the IP flow or has decided that the flow is no longer of interest. Method 500*b* then proceeds to step 560, previously described with reference to FIG. 5A.

Step 582 is substantially identical to 552. Note that here, the value is recorded, but no message is sent to DPI B 140 because not all fields of interest have been seen at this point. Instead, after completion of step 582, exemplary method 500*b* proceeds to terminate at step 585, and network element 130*a*, 130*b* awaits the next packet.

According to the foregoing, various exemplary embodiments enable intelligent selection of information to be sent to a content identification device. In particular, by keeping track of the fields of interest needed by the content identification device, a deep packet inspection module may send only those packets that are likely to be useful to the content identification device. Alternatively, the deep packet inspection module may store the useful information and send a single message to the content identification device containing all the information that is needed for accurate content identification. Accordingly, by ignoring useless packets and packets received after sufficient information has been previously gathered, the amount of processing performed by the content identification device for each flow can be reduced, significantly increasing the productivity of the content identification device.

While the foregoing description has described various embodiments of the invention in terms of P2P traffic, it should be apparent that various exemplary embodiments of the invention could be implemented to mirror packets and/or extract content information from traffic utilizing other protocols.

It should be apparent that the above described subject matter may be used in conjunction with the following co-pending applications, all to Dolganow et al., which are incorporated by reference herein: application Ser. No. 12/371,140, "Apparatus and Method for Generating a Database that Maps Metadata to P2P Content"; application Ser. No. 12/371,197, "Peer-to-Peer Traffic Management Based on Key Presence in Peer-to-Peer Data Transfers"; application Ser. No. 12/371,234; "Peer-to-Peer Traffic Management Based on Key Presence in Peer-to-Peer Control Transfers"; and application Ser. No. 12/371,261, "Inline Key-Based Peer-to-Peer Processing."

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of reducing the amount of processing done by a network node in a computer network when providing content information to a content identification device, the method comprising:
   receiving, by the network node, a packet belonging to an IP flow;
   determining whether the IP flow is a flow for which content information is to be sent to the content identification device; and
   when the IP flow is a flow for which content information is to be sent to the content identification device, performing the steps of:
      determining, using deep packet inspection, that the packet contains at least one field of interest, wherein the at least one field of interest is needed by the content identification device,
      saving the value of the at least one field of interest in a memory of the node,
      determining whether all fields of interest needed by the content identification device have been seen by the network node among a plurality of packets belonging to the IP flow,
      communicating a value of the at least one field of interest to the content identification device regardless of the value of the at least one field of interest, including:
         constructing an IP flow information packet, wherein the IP flow information packet includes information that identifies the IP flow and values for all fields of interest needed by the content identification device, and
         sending the IP flow information packet to the content identification device, and
      when all fields of interest needed by the content identification device have been seen by the network node among the plurality of packets belonging to the IP flow:
         designating the IP flow as a flow for which content information is no longer to be sent to the content identification device, and
         flushing the values of all fields of interest for the IP flow from the memory,
   wherein the step of communicating the value of the at least one field of interest occurs only when all fields of interest needed by the content identification device have been seen by the network node among the plurality of packets belonging to the IP flow.

2. The method of claim 1, wherein the step of communicating the value of the at least one field of interest comprises:
   sending the packet to the content identification device.

3. The method of claim 2, further comprising:
   sending the packet to a next hop toward a destination of the packet by the network node.

4. The method of claim 1, further comprising:
   determining a traffic protocol of the IP flow; and
   determining whether the traffic protocol is a protocol for which content information is to be sent to the content identification device.

5. The method of claim 4, further comprising:
   identifying at least one field of interest needed by the content identification device for traffic using the traffic protocol, wherein the at least one field of interest is sufficient to identify content of any flow using the traffic protocol.

6. The method of claim 4, wherein the steps performed when the IP flow is a flow for which content information is to be sent to the content identification device are only performed when, in addition, the traffic protocol is a protocol for which content information is to be sent to the content identification device.

7. The method of claim 6, wherein the traffic protocol is a peer-to-peer protocol.

8. The method of claim 1, further comprising:
   when it is not yet determined whether the IP flow is a flow for which content information is to be sent to the content identification device, sending the packet to the content identification device.

9. A system in a computer network for efficiently processing packets for providing content information to a content identification device, the system comprising the content identification device and a network node, the network node comprising:
   an interface for receiving a packet belonging to an incoming Internet Protocol (IP) flow;
   an interface for communicating content information to the content identification device;
   a storage adapted to:
      store an indication that indicates whether content information is to be sent to the content identification device for the IP flow, and
      store an association that associates the IP flow with at least one field of interest, wherein a field of interest is any field that is needed by the content identification device; and
   a deep packet inspection module adapted to:
      determine whether the IP flow is a flow of interest by accessing an indication for the IP flow in storage that indicates whether the IP flow is a flow for which content information is to be sent to the content identification device, and
      when the IP flow is a flow of interest:
         determine whether the packet contains at least one field of interest,
         when the packet contains at least one field of interest, store, in the storage, an association between the IP flow and the at least one field of interest,
         determine whether the association in storage for the IP flow includes all fields of interest, communicate at least one value of the at least one field of interest to the content identification device regardless of the value of the at least one field of interest by:
constructing an IP flow information packet containing identification information of the IP flow and values for all fields of interest needed by the content identification device, and
sending the IP flow information packet to the content identification device, and
when the association in storage for the IP flow includes all fields of interest:
change the indication in storage for the IP flow to indicate that the IP flow is no longer a flow for which content information is to be sent to the content identification device, and
remove the association from storage that associates the IP flow with a value for at least one field of interest,
wherein the deep packet inspection module is adapted to communicate content information only when all fields of interest needed by the content identification device have values in storage associated with the IP flow.

10. The system of claim 9, wherein the content identification device is part of the network node.

11. The system of claim 9, wherein the content identification device is a standalone device.

12. The system of claim 9, wherein the deep packet inspection module is adapted to, in communicating content information, send the packet to the content identification device.

13. The system of claim 9, wherein:
the storage is further adapted to store a list of traffic protocols for which content information is to be sent to the content identification device; and
the deep packet inspection module is further adapted to:
determine a flow protocol, and
determine whether the IP flow protocol appears in the list of traffic protocols for which content information is to be sent to the content identification device.

14. The system of claim 13, wherein the deep packet inspection module is further adapted to determine that the IP flow is not a flow of interest when the IP flow protocol does not appear in the list of traffic protocols for which content information is to be sent to the content identification device.

15. The system of claim 13, wherein:
the storage is further adapted to store an association that associates a traffic protocol with at least one field of interest needed by the content identification device for traffic using the traffic protocol; and
the deep packet inspection module is further adapted to identify the at least one field of interest needed by the content identification device by retrieving an association that associates the IP flow protocol with the at least one field of interest needed by the content identification device for traffic using the traffic protocol.

16. The system of claim 9, wherein the deep packet inspection module is further adapted to send the packet to the content identification device when it is not yet determined whether the IP flow is a flow of interest.

17. A method of reducing the amount of processing done by a network node in a computer network when providing content information to a content identification device, the method comprising:
receiving, by the network node, a packet belonging to an IP flow;
determining whether the IP flow is a flow for which content information is to be sent to the content identification device; and
when the IP flow is a flow for which content information is to be sent to the content identification device, performing the steps of:
determining, using deep packet inspection, that the packet contains at least one field of interest, wherein the at least one field of interest is needed by the content identification device,
saving a value of the at least one field of interest in a memory of the node;
determining whether all fields of interest needed by the content identification device have been seen by the network node among a plurality of packets belonging to the IP flow, and
when all fields of interest needed by the content identification device have been seen by the network node among the plurality of packets belonging to the IP flow:
constructing an IP flow information packet, wherein the IP flow information packet includes information that identifies the IP flow and values for all fields of interest needed by the content identification device,
sending the IP flow information packet to the content identification device
flushing the values of all fields of interest for the IP flow from the memory, and
designating the IP flow as a flow for which content information is no longer to be sent to the content identification device.

* * * * *